(12) United States Patent
Huang et al.

(10) Patent No.: US 11,790,499 B2
(45) Date of Patent: Oct. 17, 2023

(54) CERTIFICATE IMAGE EXTRACTION METHOD AND TERMINAL DEVICE

(71) Applicant: PING AN TECHNOLOGY(SHENZHEN) CO., LTD., Shenzhen (CN)

(72) Inventors: Jinlun Huang, Shenzhen (CN); Donggen Xiong, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/167,075

(22) Filed: Feb. 3, 2021

(65) Prior Publication Data

US 2021/0166015 A1    Jun. 3, 2021

Related U.S. Application Data

(63) Continuation-in-part of application No. PCT/CN2019/118133, filed on Nov. 13, 2019.

(30) Foreign Application Priority Data

Jan. 10, 2019    (CN) .......................... 201910023382.2

(51) Int. Cl.
  *G06T 5/00*    (2006.01)
  *G06N 3/08*    (2023.01)
  (Continued)

(52) U.S. Cl.
  CPC ............ *G06T 5/009* (2013.01); *G06F 18/214* (2023.01); *G06F 18/22* (2023.01); *G06N 3/08* (2013.01);
  (Continued)

(58) Field of Classification Search
  CPC ........ G06T 5/006; G06T 5/008; G06T 5/009; G06T 2207/10024; G06T 2207/30176;
  (Continued)

(56) References Cited

U.S. PATENT DOCUMENTS

2012/0250987 A1    10/2012    Yu et al.
2013/0108123 A1    5/2013    Hwang et al.
(Continued)

FOREIGN PATENT DOCUMENTS

CN    101038686 A    9/2007
CN    105825243 A    8/2016
(Continued)

*Primary Examiner* — Kenny A Cese
(74) *Attorney, Agent, or Firm* — Robert L. Stearns; Dickinson Wright PLLC

(57) ABSTRACT

A certificate image extraction method, including: step S101, obtaining an original image containing a certificate image, wherein the original image is obtained by a camera device by means of photographing; step S102, performing white balance processing on the original image to obtain a balance image according to component values of pixel points in the original image in red, green and blue color components; step S103, determining a position of the certificate image in the balance image according to a pre-trained certificate feature model; wherein the certificate feature model is obtained by training based on historical certificate images, a certificate image model and a preset initial weight value; and step S104, extracting the certificate image from the balance image according to the position of the certificate image. By performing the certificate image extraction method, the accuracy of extracting the certificate image from the original image is improved.

12 Claims, 3 Drawing Sheets

(51) Int. Cl.
*G06V 30/40* (2022.01)
*G06V 30/413* (2022.01)
*G06V 30/19* (2022.01)
*G06F 18/22* (2023.01)
*G06F 18/214* (2023.01)

(52) U.S. Cl.
CPC ........ *G06T 5/006* (2013.01); *G06V 30/19147* (2022.01); *G06V 30/19173* (2022.01); *G06V 30/40* (2022.01); *G06V 30/413* (2022.01); *G06T 2207/10024* (2013.01); *G06T 2207/30176* (2013.01)

(58) Field of Classification Search
CPC ......... G06T 2207/20081; G06F 18/214; G06F 18/22; G06V 30/19147; G06V 30/191; G06V 30/40; G06V 30/413; G06V 30/19173; G06N 3/08
USPC ................. 382/162–165, 159, 170, 181, 209
See application file for complete search history.

(56) References Cited

U.S. PATENT DOCUMENTS

| 2018/0276493 | A1* | 9/2018 | Wang .................. G06N 3/045 |
| 2018/0300578 | A1* | 10/2018 | Wilbert ................ G08G 1/0175 |
| 2020/0097569 | A1* | 3/2020 | Sewak .................. G06F 16/345 |
| 2020/0202199 | A1* | 6/2020 | Lee ........................ G06N 3/084 |

FOREIGN PATENT DOCUMENTS

| CN | 107844748 A | 3/2018 |
| CN | 109871845 A | 6/2019 |
| JP | 1998042180 A | 2/1998 |
| JP | 2006129442 A | 5/2006 |
| JP | 2006174281 A | 6/2006 |
| JP | 2007150593 A | 6/2007 |
| JP | 2013197848 A | 9/2013 |
| JP | 2017059207 A | 3/2017 |
| JP | 2018533808 A | 11/2018 |
| JP | 2009239323 A | 10/2019 |
| WO | 2018173108 A1 | 9/2018 |

\* cited by examiner

CERTIFICATE IMAGE EXTRACTION METHOD AND TERMINAL DEVICE

CROSS-REFERENCE TO RELATED APPLICATION

The present application is a continuation-in-part application of PCT Application Ser. No. PCT/CN2019/118133 with an international filing date of Nov. 13, 2019, which claims priority to Chinese patent application No. 201910023382.2, filed with China National Intellectual Property Administration on Jan. 10, 2019, and entitled "certificate image extraction method and terminal device", the contents of which are incorporated herein by reference in entirety.

TECHNICAL FIELD

The present disclosure relates to the technical field of computer applications, and particularly relates to a certificate image extraction method, a terminal device and a non-volatile computer readable storage medium.

BACKGROUND

Machine vision enables an "object" to have the function of viewing, the machine vision can not only have information acquisition function, but also perform high-level functions such as processing and recognition. In addition, the cost of equipment used for machine vision is low, the most frequently used device is a camera. According to the statistics, the quantity of installations of public cameras in large cities and cameras at home and in enterprises in recent years has been greatly increased, the quantity of installations of the home cameras and enterprise cameras is also huge, many cameras may be used in the corners of cities or at home and in the enterprises in the future with the popularization of cameras. With the rapid popularization of cameras, relevant applications of machine vision technology will be developed more rapidly. With the development of the technical field of machine vision, certificate identity verification technique will also be widely used in this machine vision tide.

In the prior art, cameras arranged at everywhere of the cities can be called to perform identity authentication at any time, so that finding the information of a specialized person in tens of thousands of people becomes simple. However, due to the influences of many external environments, the quality of obtained certificate image is poor, and thus accurate certificate images cannot be obtained.

Technical Problem

Embodiments of the present disclosure provide a certificate image extraction method, a terminal device and a non-volatile computer readable storage medium, which aims at solving the problem in the prior art that the quality of obtained certificate image is poor and inaccurate due to influences of many external environments.

Technical Solution

In the first aspect, embodiments of the present disclosure provide a certificate image extraction method, performed on a terminal device, including:
obtaining an original image containing a certificate image, wherein the original image is obtained by a camera device by means of photographing;
performing white balance processing on the original image to obtain a balance image according to component values of pixel points in the original image in red, green and blue color components;
determining a position of the certificate image in the balance image according to a pre-trained certificate feature model; wherein the certificate feature model is obtained by training based on historical certificate images, a certificate image model and a preset initial weight value; and
extracting the certificate image from the balance image according to the position of the certificate image.

In the second aspect, embodiments of the present disclosure provide a terminal device, including a memory, a processor and a computer readable instruction stored in the memory and executable by the processor, the processor is configured to execute the computer readable instruction to implement following steps:
obtaining an original image containing a certificate image, wherein the original image is obtained by a camera device by means of photographing;
performing white balance processing on the original image to obtain a balance image according to component values of pixel points in the original image in red, green and blue color components;
determining a position of the certificate image in the balance image according to a pre-trained certificate feature model; wherein the certificate feature model is obtained by training based on historical certificate images, a certificate image model and a preset initial weight value; and
extracting the certificate image from the balance image according to the position of the certificate image.

In the third aspect, embodiments of the present disclosure provide a non-volatile computer readable storage medium which stores a computer readable instruction, the computer readable instruction is configured to be executed by a processor to cause the processor to perform the method in the first aspect.

Advantageous Effects

In the embodiments of the present disclosure, the original image containing the certificate image is acquired; the original image is obtained by the camera device through photographing; the white balance processing is performed on the original image according to the component values of each pixel point in the original image in red, green, and blue color components, and the balance image is obtained; the position of the certificate image in the balance image is determined according to the pre-trained certificate feature model; the certificate feature model is obtained by training based on the historical certificate images, the certificate image model and the preset initial weight value; the image of the certificate is extracted from the balance image according to the position of the certificate image. The position of the certificate in the original image is determined according to the certificate feature model, and the certificate image in the image is extracted, so that the accuracy of extracting the certificate image from the original image is improved.

DESCRIPTION OF THE EMBODIMENTS

In the following descriptions, in order to describe but not intended to limit the present disclosure, concrete details such as specific system structure, technique, and the like are proposed, so that a comprehensive understanding of the embodiments of the present disclosure is facilitated. However, it will be apparent to the ordinarily skilled one in the art that, the present disclosure may also be implemented in some other embodiments without these concrete details. In some other conditions, detailed explanations of method, circuit, device and system well known to the public are omitted, so that unnecessary details can be prevented from obstructing the description of the present disclosure.

In order to illustrate the technical solutions of the present disclosure, the technical solutions of the present disclosure are described below with reference to detailed embodiments.

Figure 1:
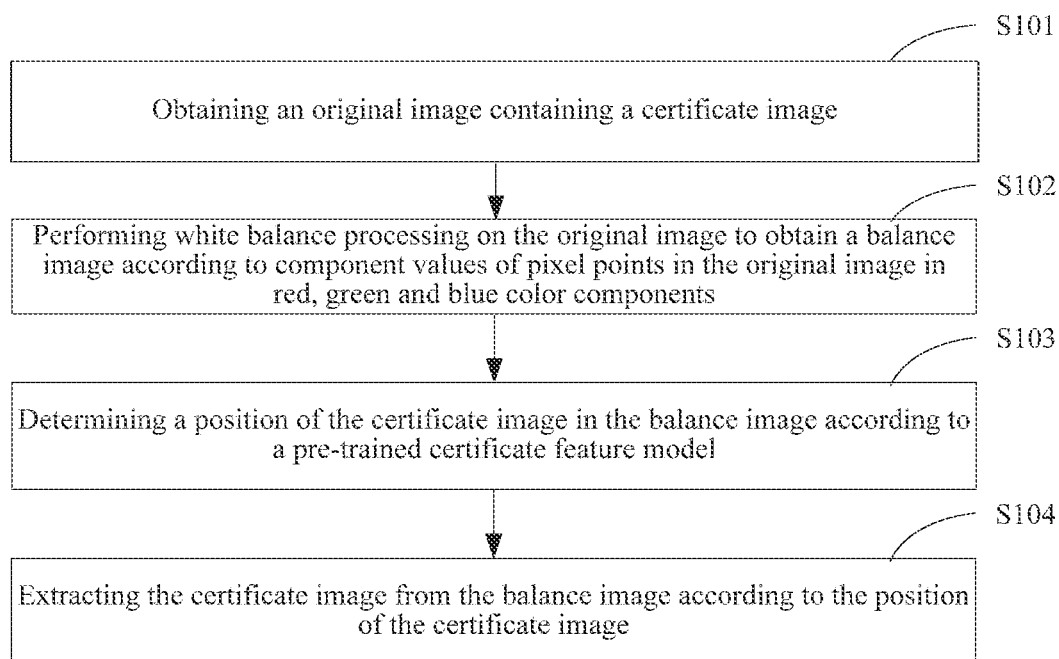
FIG. 1 illustrates a schematic flowchart of a certificate image extraction method according to embodiment one of the present disclosure.

Referring to FIG. 1, FIG. 1 illustrates a flowchart of a certificate image extraction method according to embodiment one of the present disclosure. The executive subject of the certificate image extraction method in this embodiment is a terminal device. The terminal device includes, but is not limited to, a mobile terminal such as a smart phone, a tablet computer, a wearable device, etc. The terminal device may also be a desktop computer or the like. The certificate image extraction method as shown in FIG. 1 may include the following steps:

In step of S101, obtaining an original image containing a certificate image; wherein the original image is obtained by a camera device by means of photographing.

With the development of real name registration in the society, rapid and accurate collection of certificate information has become a more and more important topic, the improvement of hardware performance and the high-speed development of digital image processing technology greatly facilitates the improvement of performance of certificate information acquisition system. The certificate image processing part, which affects the overall performance of the certificate information acquisition system, has large influence on the performance of the system, and corresponding processes are also different upon different systems. Social requirements on public safety are becoming higher and higher with the improvement of national laws and regulations, thus, relevant departments put real name registration into force in many aspects of social people's livelihood, such as real name registration in Internet surfing and account opening, mobile phone real name registration, and the like. If extraction of personal information is merely depends on manual entering and checking, low work efficiency and higher error rate is caused inevitably, and serious inconveniences are brought to the two parties in business. The certificate information acquisition system may realize automatic extraction of certificate information, and recording of certificate certificates such as recognition card, passport and the like through radio frequency recognition technology and image recognition technology. The development of the information acquisition approaches and the development of image processing technology make the space of certificate reader to be smaller, and make the speed of information extraction to be faster, and reduce error rate of information. Great convenience is brought to two parties in business while public safety and management efficiency are improved. In addition, the certificate information acquisition system also facilitates the development of applications of real name registration. The development of the certificate information acquisition system enables real name registration to be conducted in the scenarios of huge human traffic flow such as the train, the car, the subway and the like, which greatly guarantees safeties in railway, highway and urban subway traffic.

A mobile intelligent terminal refers to a terminal which has a variety of operating systems like a computer, but is relatively smaller in volume with respect to a computer, is convenient to be carried, and has a wireless internet surfing function, so that a user may download various applications of the corresponding operating system according to his/her own demand. Mobile intelligent terminals which are common in daily life include a smart phone, a tablet computer, a vehicle-mounted computer, a wearable mobile device and the like. Smart phone is currently commonly used mobile intelligent terminal, the user may install an application, a game or a functional program according to a third-party service provider into the intelligent terminal according to his/her own preference or demand, in this way, the requirements of the user on the functions of the intelligent terminal are met. In recent years, with the continuous development of technology, various certificates are no longer a certificate, but rather a card like an identity card. With the use of certificates, recording of certificate information becomes an important issue, too. The traditional information recording mode is that information in the relevant table is filled in a manual mode, then, key information is stored in the computer by an internal worker according to the contents in the table, or the certificate is scanned and uploaded at a designated place. Regarding the first information recording manner, although the location where the information is recorded is not limited, a large amount of human resources and material resources need to be consumed every time when the information is recorded, and an erroneous record is prone to occur. For the second information recording manner, even though there is an improvement in the efficiency and accuracy of information recording, the place of use is relatively fixed. The presence of the mobile intelligent terminal makes it possible to record certificate information anytime and anywhere. The information recognition system on the mobile intelligent terminal may be widely applied to the departments that need to check certification information, such as service industries, traffic systems, public security systems, etc. The certificate information may be collected and checked without a large number of employees, the efficiency and the accuracy of recognition of the certificate information in collection and checking are improved, and this information recognition system has a wide application scope.

In practical application, the user may upload the original image captured by the mobile terminal to a server or an image processing terminal, the image processing terminal processes and recognizes the original image after receiving the original image. An application scenario in the present solution may be a website where the user certificate image is acquired and verified, an image acquisition instruction is sent to the user, the user takes a picture, such as a picture of identity card, a picture of passport and the like using his/her own terminal device, and sends the captured picture to the executive subject through application software or webpage in the mobile terminal, the executive subject processes and recognizes the original image after obtaining the original image.

In step of S102, performing white balance processing on the original image to obtain a balance image according to component values of pixel points in the original image in red, green and blue color components.

In a practical application, the most commonly used color space representing the image is RGB (Red, Green, Blue). The three color components of the true color image are represented by a bit of one byte respectively, thus, a space of one point needs to be represented using 3 bytes, and a 1024×768 true color image with a resolution of 1024×768 requires a storage of 1024×768×3=2.25 MB. Such a big storage occupation is a great expenditure on early computer, and this storage occupation also appears to be huge in some environments where memory space is relatively small, such as cell phone. Thus, all colors in the image are stored in one table, the actual image data is no longer RGB data, but instead is the index in table where the RGB data is stored, in order to control the storage space of index, the requirement on the storage space of the table is less than 256 elements, that is, an range represented by 1 byte, this byte may represent the color of one point in this image. If the table is smaller, the bits of the number of indexes used by one point is smaller, in this way, a true color image 256 color palette with the resolution of 1024×768 only requires 1024× 768×3=768.8 KB. Two types of palettes are always used in color quantification, one type of palette is a true color or a pseudo-true color image which is quantified into palette image; another type of palette is a palette image that is continued to be quantified. With the continuous increasing of storage capacity of computer, the palette image gradually fades out of the stage of the personal computer, however, the palette image is still widely used in some special equipment such as mobile phones, especially in game applications of mobile phones.

With the development of computer technology, processing of graphics and images have been widely used in the various fields such as industry, agriculture, military, medicine, management and the like. Colorful original images in the nature may be collected using the devices such as a color scanner, a camera and the like. When the original images are displayed on a computer, the number of colors that may be represented is always limited due to the performances that can be according to the display device and economic reasons. In another aspect, the number of colors that may be displayed by different conditions of computer device are always different, it is desirable to enable the same image to be better represented under the condition of lower level of machine equipment.

In practical application, the balance is an indicator that describes the accuracy of white color which is generated after three primary colors of red, green, and blue are mixed in the display. White balance is a very important concept in the field of television imaging, and a series of problems with color reduction and tone processing may be solved through white balance. White balance is generated while an electronic image reproduces true color, and is early used in the field of professional photography, and is currently widely used in household electronic products. However, the development of technology makes adjustment of white balance to be simpler and easier, many users do not even know the principle of white balance, and there are many misunderstandings for the users. White balance enables a camera image to accurately reflect color condition of an object. In this embodiment, white balance processing may be performed on the original image by means of manual white balance and automatic white balance to obtain the balance image.

In step of S103, determining the position of the certificate image in the balance image according to a pre-trained certificate feature model; wherein the certificate feature model is obtained by training based on the historical certificate image, the certificate image model and the preset initial weight value.

When recognizing a character of a certificate, certificate recognition methods mainly include a hidden Markov model, a neural network, a support vector machine, and a template matching. All methods using Hidden Markov Model require preprocessing and setting parameters according to existing knowledge. This method achieves a higher recognition rate through complex preprocessing and parameterization, and may also train a certificate feature model through a multi-layer sensing neural network. The neural network is trained using a backward feedback method, and a relative good result may be obtained only if this network has been trained many times. This process is time-consuming, and the number of layers of hidden layers and the number of neurons of the hidden layer must be obtained by experimental method. Optionally, the neural network includes 24 input layer neurons, 15 hidden layer neurons, 36 output layer neurons which recognize the certificate in the balance image.

There are countless neurons in human brain, there are innumerable contacts among these neurons, a tight neural network structure is formed through organization, which implements complex computations and functions of the human brain. The neural networks here primarily studying connection ways of these neurons and organizational structures. Regarding neural networks, the neural networks may be divided into two types, one type is layered neural network, the other type is reticular neural network. Regarding the first type of neural network, the neurons are arranged in a hierarchical manner, the neurons are arranged in parallel to form a tight mechanism in each layer, layers are interconnected by neurons, however, the neurons inside each layer cannot be interconnected; regarding the second type of neural network structure, the neurons may be interconnected.

It should be noted that, there is a need to perform some training on the neural network. Rules and methods of processing of neural networks are leaned, and problems are processed and settled by these methods. There are specifically several steps to implement forward multi-layer network structure, firstly, a training example for the forward multi-layer network needs to be provided. An input and output mode is included in this example; regarding the training of the above design, certain errors are allowed for input and output; changes need to be made for the output of the forward multi-layer network. The output is changed such that a better output may be obtained, and the condition that the output is within error range is satisfied.

In step of S104, extracting an image of the certificate from the balance image according to the position of the certificate image.

The certificate image is extracted from the balance image according to the position of the certificate image, after the position of the certificate image in the balance image is determined. In particular, the certification image extraction method may be extracting the certificate image by directly cropping from the balance image, and may also be a method for reserving the certificate image by removing the image area excluding the certificate image, the certification image extraction methods are not limited here.

In addition, image edge of the certificate image may also be detected based on an edge and gradient method, the certificate image is extracted based on the image edge. In the edge-based certificate image method, it is considered that there is a great difference between the certificate image and background edge in natural scene, edge detection is performed on the characters according to this method, so that the position of the certificate image is determined through edge information. Optionally, the image edge of the certificate image may be determined by a Sobel operator, a Robert operator, a Laplace operator. Wherein the Sobel operator determines whether the point is an edge point by determining whether a gradient of a certain pixel point in the certificate image is greater than a threshold value, the Robert operator is suitable for the images in which there is a great difference between characters and image background, the edge which is obtained after detection is thicker, the Laplace operator is very sensitive to noise, and is prone to generate a bilateral effect, and thus is not directly used for detecting the edge. The original image is converted into a binary image according to a certificate image positioning method based on connected domain, the influence of noise is reduced, areas of the certificate image are communicated by using a morphology corrosion expansion algorithm, the image is segmented by using a distinction degree between the certificate image and white background, then, the connected domain of the image of non-certificate area is excluded according the various features of the certificate image, and the certificate image area is obtained, the certificate image positioning speed is faster and the efficiency of recognizing certificate image and the characters in the certificate image may be improved according to the certificate image positioning method based on connected domain.

According to the technical solution mentioned above, the original image including the certificate image is obtained; the original image is obtained by a camera device by photographing; white balance processing is performed on the original image to obtain a balance image according to component values of pixel points in the original image in red, green, and blue color components; the position of the certificate image in the balance image is determined according to the pre-trained certificate feature model; the certificate feature model is obtained by training based on historical certificate images, a certificate image model and the preset initial weight value; and the certificate image is extracted from the balance image according to the position of the certificate image. The position of the certificate in the original image is determined according to the certificate feature model, and the certificate image in the image is extracted, so that the accuracy of extracting the certificate image from the original image is improved.

Figure 2:
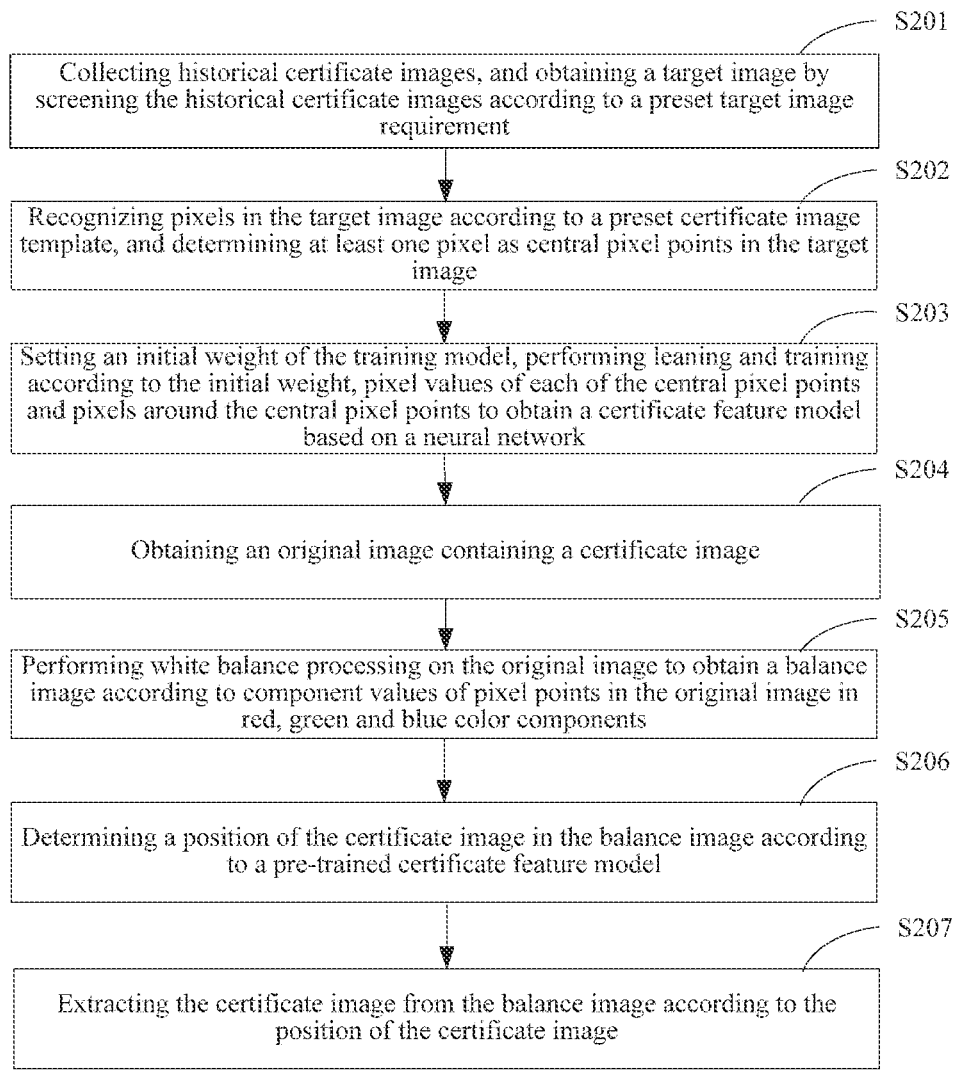
FIG. 2 illustrates a schematic flowchart of a certificate image extraction method according to embodiment two of the present disclosure.

Referring to FIG. 2, FIG. 2 illustrates a flowchart of a certificate image extraction method according to embodiment two of the present disclosure. The executive subject of the certificate image extraction method in this embodiment is a terminal device. The terminal device includes, but is not limited to, mobile terminal such as a smart phone, a tablet computer, a wearable device, etc. The terminal device may also be a desktop computer or the like. The certificate image extraction method as shown in FIG. 2 may include the following steps:

In step of S201, collecting historical certificate images, and obtaining a target image by screening the historical certificate images according to a preset target image requirement.

Before recognizing and processing the original image, the certificate feature model needs to be trained to recognize the certificate image. Thus, the certificate feature model may be firstly trained according to the historical certificate images, so that the certificate image is extracted from the original image. The data used for training the certificate feature model in the present solution may be the historical certificate images which include historical images acquired before the certificate image is extracted.

In practical application, the acquired historical certificate images may have an unqualified image, taking this into consideration, the acquired historical images are screened according to a preset requirement on target image to obtain the target image. Wherein the preset target image requirement may be the requirement on pixels, size, and photographing time of the image, in addition, the preset target image requirement may also be detecting the integrity of the image, and the requirement of the type of the certificate image, and the like. These requirements may be determined by the operator, and are not limited here; after determining the requirement on target image, matching is performed on the acquired historical certificate images according to the requirement on target image, and the historical certificate image which has a matching degree greater than a matching degree threshold is determined as the target image.

The certificate images which are obtained through various camera devices are used as initial samples for training neural network. In the learning and training process of the neural network, the selection of the training set will directly affect the time, the weight value matrix and the effect of learning and training of network learning training. In the present solution, the images which have obvious image edges, and the image edges distributed at most areas of the image are selected as the initial samples of the training set, the image edge is clearer, particle edges are distributed at everywhere of the image, and the texture features of the image are abundant, so that the neural network may be well trained, network information such as network weight value information may record more edge information, and the image may be better detected.

In step of S202, performing pixel recognition on the target image according to a preset certificate image template, and determining at least one central pixel point in the target image.

When determining a center pixel point in the image sample, a representative pixel point in the image sample may be determined as the center pixel point through image recognition. For example, when the processed original image is the image of identity card photographed by a user, four corners of an avatar may be determined as the center pixel point according to the size of avatar and the positions of characters in the known image of identity card, some characters such as the first word in the identity card or the first word in each row may also be determined as the central pixel points; furthermore, the acquired image types may also be preset, such as the the image of identity card, a certificate of real estate, etc., and information including each type of image template and the position of each image element in the template, the distance between the image element and certificate frame is determined, recognition is performed according to the information so as to accurately determine the center pixel point in the image sample, learning and training are performed through the central pixel point and the surrounding pixel points centered around the central pixel point to determine the position of the certificate in the original image.

It should be noted that, there may be at least two pixel points around the center pixel point, preferably, eight pixel points around the central pixel point may be determined to perform learning and training, so that the situation of each pixel in the image is determined more clearly.

In step S203, setting an initial parameter of the training model, performing learning and training according to the initial parameters and pixel values of each central pixel point and pixel points around the central pixel point so as to obtain a certificate feature model based on the neural network.

As for any neural network model, learning and training in application process is a key point, the network may have capacities of association, memorization, and prediction through learning and training. Generally, the determination of certain parameters is critical to learning and training process. The initial parameters of the network include the initial network architecture, the weight value of connection, the threshold and the learning rate, etc., different settings influences the rate of convergence of the network to some extent. The selection of initial parameters is not only very important but also very difficult. In addition to necessary technical processing, the establishment of network is mainly upon observation and experience.

In the training process of certificate feature model, the initial value of the model is determined firstly, the initial weight value and the threshold value of the network are generally selected randomly from the range of [−1, 1] or [0, 1], this range would be appropriately changed by some improved algorithms. Secondly, normalization processing is performed on a vector, in the learning and training process, it is inappropriate to make node input be too large, too small weight value adjustment is not beneficial to network learning and training. Image training is gray-based, thus, image matrix is a shaping value in the range of [0, 255], the dimension of feature vector is relatively high, in order to improve network training speed, a normalization process will be performed on the feature vector. The feature vector is taken as a row vector, and is expressed as:

$X=(x_0, x_1, \ldots, x_9)$, wherein $x_0, x_1, \ldots, x_9$, is used to represent the center pixel point and its surrounding pixel points, respectively.

There may be at least two pixel points around each central pixel point in this embodiment, the number of pixel points may be 8 preferably, so that the condition of the surrounding pixel points of the central pixel point is described more accurately, gray value of 8-bit grayscale image is in the range of [0, 255], therefore, in actual processing, a normalization formula in the actual process is expressed as:

$$X' = \frac{x_0}{255}; i = 1, 2, \ldots, 9;$$

wherein $x_0$ is used to represent the pixel value of the central pixel point.

Since the object to be processed is image, the image sample set is relatively huge, and thus an idea of dividing the image into blocks is adopted. Each time an image sample is input in the neural network, the gray values of these pixels may be input into the input layer sequentially from top to bottom and from left to right by determining one or at least two center pixel points and performing learning and training on template pixels around the central pixel points, that is, 8 pixels around the center pixel points. There is a deviation value between the gray value of the expected output pixel provided by the output layer and the gray value of the output pixel of the actual output layer, and this deviation value is propagated in a reverse direction, which enables the threshold value of each neuron and the connected weight value between the neurons to be changed, in this way, the network may effectively record more edge information. The process described above is repeatedly performed until the deviation value is reduced to be within a specified range, or the number of training times reaches the target number of times and the task of training is completed. It is specified in the training requirement that the training of the network may be stopped at any time, meanwhile, in order to facilitate future use of the neural network for detection, the trained weight value and the threshold value are all stored in a backend database, the trained network is saved finally.

In step of S204, obtaining the original image containing a certificate image; wherein the original image is obtained through photographing by a camera device.

In this embodiment, the step S204 has an implementation mode identical to that of Step S101 in the embodiment corresponding to FIG. 1, regarding the implementation mode of step S204, reference may be made to the related descriptions in the step S101 in the embodiment corresponding to FIG. 1, the implementation mode of step S204 is not repeatedly described here.

In step of S205, performing white balance processing on the original image according to the component values of pixel points in the original image in red, green and blue color components to obtain a balance image.

After obtaining the original image, white balance processing is performed on the original image according to the component values in the red, green and blue color components of each pixel point in the original image to obtain a balance image.

Further, step S205 may specifically include following steps S2051-S2052:

In step of S2051, estimating an average chromatic aberration of each of the pixel points in the original image according to a component value of each of the pixel points in the original image in red, green, and blue color components.

The processing of performing filtering interference information, enhancing effective information on image before performing morphological processing or matching or recognition on image is referred to as image preprocessing. The primary purpose of preprocessing of image is to eliminate interference or irrelevant information in the image, to recover useful real information, to enhance detectability of the relevant information, and to simplify data to the maximum extent, thereby improving the reliability of feature extraction, image segmentation, matching and recognition. The preprocessing on digital color images is generally brightness, restoration and enhancement of color. In view of the comparison and testing on various preprocessing, it is found that white balance processing has a relatively stronger influence on the final image segmentation result of the system, and has little influence on other preprocessing. Thus, said preprocessing in the present solution mainly refers to processing of white balance.

Different light sources have different spectral components and distributions, this phenomenon is referred to as color temperature. A white object tends to be red under illumination of light of low color temperature, and tends to be blue under illumination of light of high color temperature. When performing photographing, the color temperature of the ambient light source will have an effect on the image, and causes chromatic aberration of the image inevitably. In order to reduce the influence of ambient light on target color as much as possible, such that the original color of the object to be photographed may be recovered under different color temperature conditions, color correction is required to achieve correct color balance.

When three colors of red, green, and blue in the image are identical, the chromatic aberration of light is 0 and light appears as white. In image processing, YBR color model is usually used to calculate chromatic aberration. A correspondence relationship between the YBR color system and the RGB color system is as follows:

$$\begin{bmatrix} Y \\ B \\ R \end{bmatrix} = \begin{bmatrix} 0.2990 & 0.5870 & 0.1140 \\ -0.1687 & -0.3313 & 0.5000 \\ 0.5000 & -0.4187 & -0.0813 \end{bmatrix} \begin{bmatrix} R \\ G \\ B \end{bmatrix}$$

A region is defined in the space where Y is large enough, B and R are small enough, and all pixels in the region are considered as white, and may participate in the calculation of chromatic aberration. The average chromatic aberration of the white pixels is then used to represent the chromatic aberration of the entire image to achieve better accuracy. According to the characteristics of the system, a constraint is provided, and this constraint is expressed as follows: Y−|B|−|R|>180. The pixels satisfying the constraint condition are all considered as white, the average luminance of the white pixel point and the average value of red, green, and blue components are obtained.

In step of S2052, determining gain amount of each of the pixel points in red, green, and blue color components according to the average chromatic aberration of each of the pixel points.

In practical application, color gain is used to represent a freshness degree of the image, the gain amount increases color contrast, the color is more vivid and more saturated, and a stronger visual impact is caused; in another aspect, certain sharpening effect is generated, so that the lines in the edge are sharper and clearer. Some functions of the image including contrast and color saturation may be automatically adjusted by color gain. This technique used in digital camera may make the photograph to appear clearer and eye-catching.

According to the average chromatic aberration calculated according to the previous step, the gain amount of each component of the white balance may be obtained, the gain amount is expressed as follows:

$$\begin{cases} R_g = Y_{avg}/R_{avg} \\ G_g = Y_{avg}/G_{avg} \\ B_g = Y_{avg}/B_{avg} \end{cases}$$

In step of S2053, correcting, according to the gain amount, the color temperature of each pixel point in the original image to obtain the balance image.

In the present solution, color temperature correction is performed on each pixel of the whole image according to the gain amount obtained in the previous step, and the calculation formula is particularly expressed as follows:

$$\begin{cases} R_{new} = R_g \cdot R \\ G_{new} = G_g \cdot G \\ B_{new} = B_g \cdot B \end{cases}$$

Optionally, image enhancement may also be performed to eliminate or reduce noise in the image, enhanced contrast in the image improves positioning of text area. Horizontal correction of the image is converting the original image into the image in which characters are horizontally distributed, so that accuracy of positioning the areas of characters is improved. The image enhancement method may be Gaussian blur and sharpening processing, the image Gaussian blur process is a common method for detail fuzzification and noise reduction, the Gaussian blur process weight values and adds 8 connected domains of the point by certain weight value, and takes the weight value as the pixel value of the point. Many noises in the image may be smoothed and the contour of the target image in the image may be highlighted using a Gaussian blur smoothing process. The Gaussian blur smoothing process is only applicable to the image in which image background is complex and the contour of the target in the image is significant. The details of the image may be smoothed through smoothing process, and some of the insignificant contour details may also be smoothed under the condition of smooth noise.

In addition, smoothing and filtering of the image may also be performed on the original image, and some measures are taken for the reduction in the quality of the image caused during the generation of the image. The quality of the image may be improved. In particular, some information of the image is compensated in a targeted manner. Another method is processing the image to protrude information of a part of the image. Furthermore, the image information which is not very important is further reduced. In the image processing of the certificate, it is often desirable to obtain image information of certificate using a certificate collection tool. Some noises are often generated during this process. Therefore, there is a need to attempt to reduce noise. The quality of the image may be improved according to this method. The generated noises may be disturbed. Better image information is obtained. Important images information is enhanced. The technique of image preprocessing is smoothing of the image. For image smoothing techniques, the enhancement effect of the image is mainly achieved according to performance requirements and by two methods which are described as follows: firstly, important information such as lines and edge profiles of the image needs to be reserved, and they are not allowed to be destroyed casually. Secondly, regarding image, pictures of image need to be clear and image effect needs to be better.

In step of S206, determining the position of the certificate image in the balance image according to a pre-trained certificate feature model; wherein the certificate feature model is trained based on historical certificate images, a certificate image model and the preset initial weight value.

The certificate feature model is trained according to multi-layer sensing neural network, the neural network is trained using a backward feedback method, a relative good result may be obtained if this network has been trained many times. This process is time-consuming, and the number of layers of hidden layers and the number of neurons of the hidden layer must be obtained by an experimental method. Optionally, the neural network includes 24 input layer neurons, 15 hidden layer neurons, 36 output layer neurons which recognizes the certificate in the balance image.

Furthermore, step S206 may specifically include step S2061:

In the step of S2061, correcting the initial parameter of the certificate feature model, if a distance difference between the position of the certificate obtained according to the certificate feature model and the actual position of the certificate is greater than or equal to a preset difference threshold.

When detecting the position of the certificate image in the original image according to the certificate feature model, a difference between the detection result and the actual result of the certificate image is prone to occur, in this case, the parameters of the certificate feature model may be adjusted, such that the subsequent detection result may be more accurate. The specific implementation mode is:

determining a distance difference between a position of the certificate obtained according to the certificate feature model and an actual position of the certificate;

if the distance difference value is greater than or equal to the difference threshold value, the initial parameter of the certificate feature model is corrected according to the formula expressed as follows:

$$w_{ij}(k+1) = w_{ij}(k) - \eta \frac{\partial E(k)}{\partial w_{ij}(k)};$$

wherein $w_{ij}(k)$ is used to represent weight value when performing the kth training; $w_{ij}(k+1)$ is used to represent the weight value when performing the (k+1)th training; $\eta$ is used to represent the learning rate, and $\eta>0$; $E(k)$ is used to represent an expected value of a position of the certificate image obtained through the previously performed K times of training.

When the actual output value of the neural network is not identical to the expected output value, an error signal is obtained, and the error signal is propagated back from the output terminal, and a weight coefficient is continuously corrected in the propagation process to minimize an error function, the network error generally use mean square error to modify the weight value, the formula is corrected as follows:

$$w_{ij}(k+1) = w_{ij}(k) - \eta \frac{\partial E(k)}{\partial w_{ij}(k)}$$

In this formula, the weight value $w_{ij}(k)$ is used to represent the weight value when performing the kth training; $w_{ij}(k+1)$ is used to represent the (k+1)th training; $\eta$ is used to represent the learning rate, and $\eta>0$; $E(k)$ is used to represent an expected value of a position of the certificate image obtained through the previously performed K times of training, $$-\eta \frac{\partial E(k)}{\partial w_{ij}(k)}$$

represents negative gradient when performing the kth training.

In step of S207, extracting the image of the certificate from the balance image according to the position of the certificate image.

In this embodiment, the implementation mode of the step S207 is identical to the implementation mode of the step S105 in the embodiment corresponding to FIG. 1, regarding the implementation mode of the step S207, reference can be made to the relevant descriptions of the step S105 in the embodiment corresponding to FIG. 1.

According to the present solution, the target image is obtained by collecting the historical certificate images and screening the historical certificate images according to the preset target image requirement; pixel recognition is performed on the target image according to the preset certificate image template, and at least one central pixel point in the target image is determined; and initial parameters of the training model is set, learning and training are performed according to the initial parameters, pixel values of each of the central pixel points and the pixel points around the central pixel point, and a certificate feature model is obtained based on the neural network. The original image containing the certificate image is acquired; the original image is obtained by a camera device by means of photographing; the white balance processing is performed on the original image according to the component values of each pixel point in the original image in red, green, and blue color components and the balance image is obtained; the position of the certificate image in the balance image is determined according to the pre-trained certificate feature model; the certificate feature model is obtained by training based on the historical certificate images, the certificate image model and the preset initial weight value; the image of the certificate is extracted from the balance image according to the position of the certificate image. By preprocessing the obtained original image of the image to be extracted, the position of the proprocessed certificate is determined according to the certificate feature model, the certificate image in the image is extracted, so that the accuracy of extracting the certificate image from the original image is improved.

Figure 3:
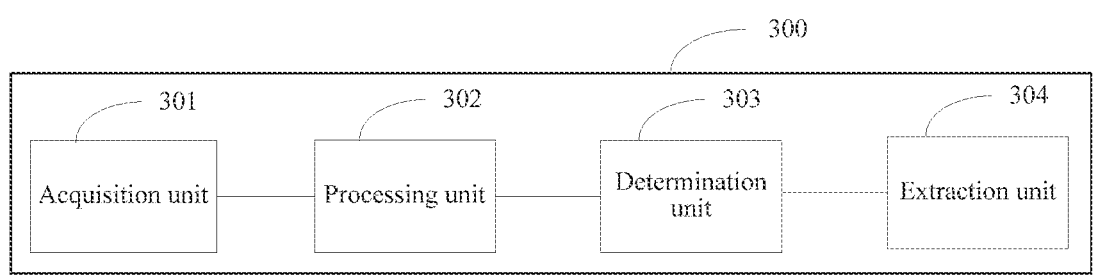
FIG. 3 illustrates a schematic diagram of a terminal device according to embodiment three of the present disclosure.

Referring to FIG. 3, FIG. 3 illustrates a schematic diagram of a terminal device provided by embodiment three of the present disclosure, the various units included in the terminal device are configured to perform the various steps in the embodiments corresponding to FIG. 1 and FIG. 2. Regarding the details of these steps, reference can be made to the relevant descriptions in the corresponding embodiments. For the convenience of description, the part relevant to this embodiment is illustrated merely. The terminal device 300 in this embodiment includes:

an acquisition unit 301 configured to obtain an original image containing a certificate image, wherein the original image is obtained by a camera device by means of photographing;

a processing unit 302 configured to perform white balance processing on the original image to obtain a balance image according to component values of pixel points in the original image in red, green and blue color components;

a determination unit 303 configured to determine a position of the certificate image in the balance image according to a pre-trained certificate feature model; wherein the certificate feature model is obtained by training based on historical certificate images, a certificate image model and a preset initial weight value; and an extraction unit 304 configured to extract the certificate image from the balance image according to the position of the certificate image.

Furthermore, the terminal device may further include:

a screening unit configured to collect historical certificate images and obtain a target image by screening the historical certificate images according to a preset target image requirement;

a recognition unit configured to recognize pixels in the target image according to a preset certificate image template, and to determine at least one pixel as central pixel points in the target image; and a training unit configured to set an initial weight value of the training model, to perform learning and training according to the initial weight value, pixel values of each of the central pixel points and pixels around the central pixel points, and to obtain a certificate feature model based on a neural network.

Furthermore, the determination unit may include:

a correction unit configured to correct an initial parameter of the certificate feature model, if a distance difference between the position of the certificate obtained according to the certificate feature model and an actual position of the certificate is greater than or equal to a preset difference threshold value.

Furthermore, the correction unit may include:

a distance calculation unit configured to determine the distance difference between the position of the certificate obtained according to the certificate feature model and the actual position of the certificate; and a parameter correction unit configured to correct, if the distance difference value is greater than or equal to the difference threshold value, the initial parameter of the certificate feature model according to the formula expressed as follows:

$$w_{ij}(k+1) = w_{ij}(k) - \eta \frac{\partial E(k)}{\partial w_{ij}(k)};$$

wherein $w_{ij}(k)$ is used to represent a weight value in kth training; $w_{ij}(k+1)$ is used to represent a weight value in (k+1)th training; $\eta$ is used to represent a learning rate and $\eta$ is greater than zero, E(k) is used to represent an expected value of a position of the certificate image obtained by previously performed K times of training.

Furthermore, the processing unit 302 may include:

a chromatic aberration estimation unit configured to estimate an average chromatic aberration of each of the pixel points in the original image according to the component values of the pixel points in the original image in red, green, and blue color components;

a gain calculation unit configured to calculate a gain amount of each of the pixel points in red, green, and blue color components according to the average chromatic aberration of each of the pixel points; and a balance processing unit configured to correct, according to the gain amount, a color temperature of each of the pixel points in the original image to obtain the balance image.

Figure 4:
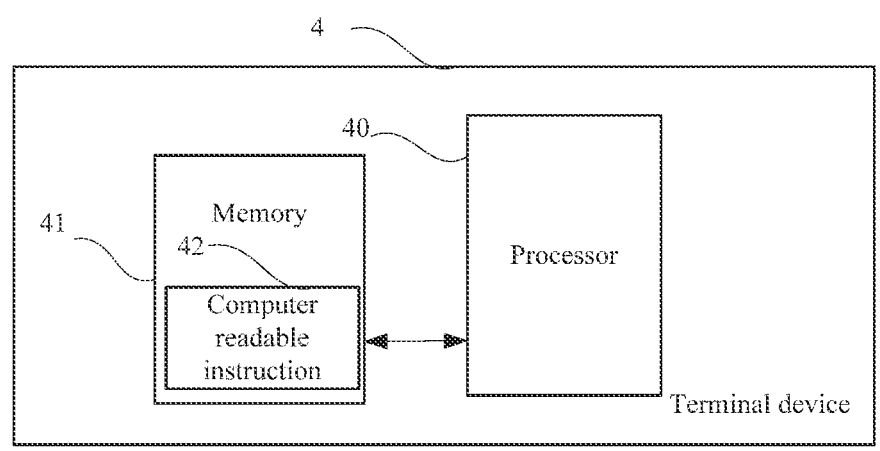
FIG. 4 illustrates a schematic diagram of the terminal device according to embodiment four of the present disclosure.

In the present solution, the original image containing the certificate image is acquired; the original image is obtained by the camera device through photographing; the white balance processing is performed on the original image according to the component values of each pixel point in the original image in red, green, and blue color components, and the balance image is obtained; the position of the certificate image in the balance image is determined according to the pre-trained certificate feature model; the certificate feature model is obtained by training based on the historical certificate images, the certificate image model and the preset initial weight value; the image of the certificate is extracted from the balance image according to the position of the certificate image. The position of the certificate in the original image is determined according to the certificate feature model, and the certificate image in the image is extracted, so that the accuracy of extracting the certificate image from the original image is improved. FIG. 4 illustrates a schematic diagram of a terminal device according to embodiment four of the present disclosure. As shown in FIG. 4, the terminal device 4 in this embodiment includes: a processor 40, a memory 41 and a computer readable instruction 42 stored in the memory 41 and executable by the processor 40. The processor 40 is configured to implement the steps in the embodiment of the certificate image extraction method such as the steps 101-104 as shown in FIG. 1, when executing the computer readable instruction 42. As an alternative, the processor 40 is configured to implement the functions of the various modules/units such as the units 301-304 shown in FIG. 3 in the various device embodiments, when executing the computer readable instruction 42.

Exemplarily, the computer readable instruction 42 may be divided into one or a plurality of modules/units, the one or plurality of modules/units are stored in the memory 41, and executed by the processor 40 so as to implement the present disclosure. The one or plurality of modules/units can be a series of computer program instruction segments that can accomplish particular functionalities, these instruction segments are used for describing an executive process of the computer readable instruction 42 in the terminal device 4.

The terminal device 4 may be a computing device such as a desktop computer, a notebook, a palm computer, and the like, the terminal device 4 may include but is not limited to: the processor 40, the memory 41. The person of ordinary skill in the art may be aware of the fact that, FIG. 4 is merely an example of the terminal device 4, and is not constituted as limitation to the terminal device 4, more or less components shown in FIG. 4 may be included, or some components or different components can be combined; for example, the terminal device 4 may also include an input and output device, a network access device, a bus, etc.

The so called processor 40 may be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, or as an alternative, the processor can also be any conventional processor and so on.

The memory 41 may be an internal storage unit of the terminal device 4, such as a hard disk or a memory of the terminal device 4. The memory 41 can also be an external storage device of the terminal device 4, such as a plug-in hard disk, a SMC (Smart Media Card), a SD (Secure Digital) card, a FC (Flash Card) equipped on the terminal device 4. Further, the memory 41 may not only include the internal storage unit of the terminal device 4 but also include the external storage device of the terminal device 4. The memory 41 is configured to store the computer program, and other procedures and data needed by the terminal device 4. The memory 41 may also be configured to store data that has been output or being ready to be output temporarily.

The person of ordinary skilled in the art may be aware of that, a whole or a part of flow process of implementing the method in the aforesaid embodiments of the present disclosure may be accomplished by using computer program to instruct relevant hardware. The computer program may be stored in a non-volatile computer readable storage medium, when the computer program is executed, the steps in the various method embodiments described above may be included. Any references to memory, storage, databases, or other media used in the embodiments provided herein may include non-volatile and/or volatile memory. The non-volatile memory may include ROM (Read Only Memory), programmable ROM, EPROM (Electrically Programmable Read Only Memory), EEPROM (Electrically Erasable Programmable Read Only Memory), or flash memory. The volatile memory may include RAM (Random Access Memory) or external cache memory. By way of illustration instead of limitation, RAM is available in a variety of forms such as SRAM (Static RAM), DRAM (Dynamic RAM), SDRAM (Synchronous DRAM), DDR (Double Data Rate) SDRAM, ESDRAM (Enhanced SDRAM), Synchlink DRAM, RDRAM (Rambus Direct RAM), DRDRAM (Direct RamBus Dynamic RAM), and RDRAM (Rambus Dynamic RAM), etc.

As stated above, the foregoing embodiments are merely used to explain the technical solutions of the present disclosure, and are not intended to limit the technical solutions. Although the present disclosure has been described in detail with reference to the foregoing embodiments, the ordinarily skilled one in the art should understand that the technical solutions described in the foregoing embodiments can still be modified, or equivalent replacement can be made to some of the technical features. Moreover, these modifications or substitutions which do not make the essences of corresponding technical solutions depart from the spirit and the scope of the technical solutions of the embodiments of the present disclosure should all be included in the protection scope of the present disclosure.

What is claimed is:

1. A certificate image extraction method, performed on a terminal device, comprising:
    obtaining an original image containing a certificate image, wherein the original image is obtained by a camera device by means of photographing;
    performing white balance processing on the original image to obtain a balance image according to component values of pixel points in the original image in red, green and blue color components;
    determining a position of the certificate image in the balance image according to a pre-trained certificate feature model; and
    extracting the certificate image from the balance image according to the position of the certificate image;
    wherein before the step of determining a position of the certificate from the balance image according to a pre-trained certificate feature model, the method further comprises:
    collecting historical certificate images, and obtaining a target image by screening the historical certificate images according to a preset target image requirement;
    recognizing pixels in the target image according to a preset certificate image template, and determining at least one pixel as central pixel points in the target image;
    setting an initial weight value of the training model, determining an output position of the certificate image according to the initial weight value, pixel values of each of the central pixel points and pixels around the central pixel points, and adjusting the initial weight value according to a difference value between the output position and a preset expected position so as to obtain a target weight value, and determining a certificate feature model based on a neural network according to the target weight value.

2. The certificate image extraction method according to claim 1, wherein the step of determining the position of the certificate image in the balance image according to the pre-trained certificate feature model comprises:
    correcting an initial parameter of the certificate feature model, if a distance difference between the position of the certificate obtained according to the certificate feature model and an actual position of the certificate is greater than or equal to a preset difference threshold value.

3. The certificate image extraction method according to claim 2, wherein the step of correcting the initial parameter of the certificate feature model, if the distance difference between the position of the certificate obtained according to the certificate feature model and the actual position of the certificate is greater than or equal to the preset difference value threshold comprises:
    determining the distance difference between the position of the certificate obtained according to the certificate feature model and the actual position of the certificate;
    correcting, if the distance difference value is greater than or equal to the difference threshold value, the initial parameter of the certificate feature model according to the formula expressed as follows:

$$w_{ij}(k+1) = w_{ij}(k) - \eta \frac{\partial E(k)}{\partial w_{ij}(k)};$$

wherein $w_{ij}(k)$ is used to represent a weight value when a kth training is performed; $w_{ij}(k+1)$ is used to represent a weight value when a (k+1)th training is performed; $\eta$ is used to represent a learning rate and $\eta>0$, $E(k)$ is used to represent an expected value of a position of the certificate image obtained by previously performed K times of training.

4. The certificate image extraction method according to claim 1, wherein the step of performing white balance processing on the original image to obtain the balance image according to component values of pixel points in the original image in red, green and blue color components comprises:
    estimating an average chromatic aberration of each of the pixel points in the original image according to the component values of the pixel points in the original image in red, green, and blue color components;
    determining a gain amount of each of the pixel points in red, green, and blue color components according to the average chromatic aberration of each of the pixel points; and
    correcting, according to the gain amount, a color temperature of each of the pixel points in the original image to obtain the balance image.

5. A terminal device, comprising a memory, a processor and a computer readable instruction stored in the memory and executable by the processor, the processor is configured to execute the computer readable instruction to implement following steps:
    obtaining an original image containing a certificate image, wherein the original image is obtained by a camera device by means of photographing;
    performing white balance processing on the original image to obtain a balance image according to component values of pixel points in the original image in red, green and blue color components;
    determining a position of the certificate image in the balance image according to a pre-trained certificate feature model; and extracting the certificate image from the balance image according to the position of the certificate image;

wherein before the step of determining a position of the certificate from the balance image according to a pre-trained certificate feature model, further comprising:

collecting historical certificate images, and obtaining a target image by screening the historical certificate images according to a preset target image requirement;

recognizing pixels in the target image according to a preset certificate image template, and determining at least one pixel as central pixel points in the target image;

setting an initial weight value of the training model, determining an output position of the certificate image according to the initial weight value, pixel values of each of the central pixel points and pixels around the central pixel points, and adjusting the initial weight value according to a difference value between the output position and a preset expected position so as to obtain a target weight value, and determining a certificate feature model based on a neural network according to the target weight value.

6. The terminal device according to claim 5, wherein the step of determining the position of the certificate image in the balance image according to the pre-trained certificate feature model comprises:

correcting an initial parameter of the certificate feature model, if a distance difference between the position of the certificate obtained according to the certificate feature model and an actual position of the certificate is greater than or equal to a preset difference threshold value.

7. The terminal device according to claim 6, wherein the step of correcting the initial parameter of the certificate feature model, if the distance difference between the position of the certificate obtained according to the certificate feature model and the actual position of the certificate is greater than or equal to the preset difference value threshold comprises:

determining the distance difference between the position of the certificate obtained according to the certificate feature model and the actual position of the certificate;

correcting, if the distance difference value is greater than or equal to the difference threshold value, the initial parameter of the certificate feature model according to the formula expressed as follows:

$$w_{ij}(k+1) = w_{ij}(k) - \eta \frac{\partial E(k)}{\partial w_{ij}(k)};$$

wherein $w_{ij}(k)$ is used to represent a weight value when a kth training is performed; $w_{ij}(k+1)$ is used to represent a weight value when a (k+1)th training is performed; $\eta$ is used to represent a learning rate and $\eta>0$, $E(k)$ is used to represent an expected value of a position of the certificate image obtained by previously performed K times of training.

8. The terminal device according to claim 5, wherein the step of performing white balance processing on the original image to obtain the balance image according to component values of pixel points in the original image in red, green and blue color components comprises:

estimating an average chromatic aberration of each of the pixel points in the original image according to the component values of the pixel points in the original image in red, green, and blue color components;

determining a gain amount of each of the pixel points in red, green, and blue color components according to the average chromatic aberration of each of the pixel points; and correcting, according to the gain amount, a color temperature of each of the pixel points in the original image to obtain the balance image.

9. A non-volatile computer readable storage medium, which stores a computer readable instruction, wherein the computer readable instruction is configured to be executed by a processor to cause the processor to implement following steps:

obtaining an original image containing a certificate image, wherein the original image is obtained by a camera device by means of photographing;

performing white balance processing on the original image to obtain a balance image according to component values of pixel points in the original image in red, green and blue color components;

determining a position of the certificate image in the balance image according to a pre-trained certificate feature model; and extracting the certificate image from the balance image according to the position of the certificate image;

wherein before the step of determining a position of the certificate from the balance image according to a pre-trained certificate feature model, the computer readable instruction is further configured to be executed by the processor to cause the processor to implement following steps: collecting historical certificate images, and obtaining a target image by screening the historical certificate images according to a preset target image requirement;

recognizing pixels in the target image according to a preset certificate image template, and determining at least one pixel as central pixel points in the target image;

setting an initial weight value of the training model, determining an output position of the certificate image according to the initial weight value, pixel values of each of the central pixel points and pixels around the central pixel points, and adjusting the initial weight value according to a difference value between the output position and a preset expected position so as to obtain a target weight value, and determining a certificate feature model based on a neural network according to the target weight value.

10. The non-volatile computer readable storage medium according to claim 9, wherein the step of determining the position of the certificate image in the balance image according to the pre-trained certificate feature model comprises:

correcting an initial parameter of the certificate feature model, if a distance difference between the position of the certificate obtained according to the certificate feature model and an actual position of the certificate is greater than or equal to a preset difference threshold value.

11. The non-volatile computer readable storage medium according to claim 10, wherein the step of correcting the initial parameter of the certificate feature model, if the distance difference between the position of the certificate obtained according to the certificate feature model and the actual position of the certificate is greater than or equal to the preset difference value threshold comprises:

determining the distance difference between the position of the certificate obtained according to the certificate feature model and the actual position of the certificate;

correcting, if the distance difference value is greater than or equal to the difference threshold value, the initial parameter of the certificate feature model according to the formula expressed as follows:

$$w_{ij}(k+1) = w_{ij}(k) - \eta \frac{\partial E(k)}{\partial w_{ij}(k)};$$

wherein $w_{ij}(k)$ is used to represent a weight value when a kth training is performed; $w_{ij}(k+1)$ is used to represent a weight value when a (k+1)th training is performed; $\eta$ is used to represent a learning rate and $\eta>0$, $E(k)$ is used to represent an expected value of a position of the certificate image obtained by previously performed K times of training.

12. The non-volatile computer readable storage medium according to claim 9, wherein the step of performing white balance processing on the original image to obtain the balance image according to component values of pixel points in the original image in red, green and blue color components comprises:

estimating an average chromatic aberration of each of the pixel points in the original image according to the component values of the pixel points in the original image in red, green, and blue color components;

determining a gain amount of each of the pixel points in red, green, and blue color components according to the average chromatic aberration of each of the pixel points; and correcting, according to the gain amount, a color temperature of each of the pixel points in the original image to obtain the balance image.

\* \* \* \* \*